US008265899B2

(12) United States Patent
Giordana et al.

(10) Patent No.: US 8,265,899 B2
(45) Date of Patent: Sep. 11, 2012

(54) AUTOMATIC PROCEDURE FOR MERGING TRACKS AND ESTIMATING HARMONIC COMBS

(75) Inventors: Nathalie Giordana, Antibes (FR);
Pierre Blanc-Benon, Brest (FR); Yves Chocheyras, Nice (FR)

(73) Assignee: Thales, Neuilly sur Seine (FR)

( * ) Notice: Subject to any disclaimer, the term of this patent is extended or adjusted under 35 U.S.C. 154(b) by 371 days.

(21) Appl. No.: 12/528,829

(22) PCT Filed: Feb. 19, 2008

(86) PCT No.: PCT/EP2008/052024
§ 371 (c)(1),
(2), (4) Date: Dec. 8, 2009

(87) PCT Pub. No.: WO2008/104483
PCT Pub. Date: Sep. 4, 2008

(65) Prior Publication Data
US 2010/0153063 A1 Jun. 17, 2010

(30) Foreign Application Priority Data
Feb. 27, 2007 (FR) ..................... 07 01406

(51) Int. Cl.
G06F 15/00 (2006.01)
(52) U.S. Cl. ....................................... 702/159
(58) Field of Classification Search .................. 702/159
See application file for complete search history.

(56) References Cited

FOREIGN PATENT DOCUMENTS
FR 2871578 12/2005
WO WO-0109639 2/2001
WO WO-0198796 12/2001

OTHER PUBLICATIONS

A. de Roos, The detection and classification of objects lying on the seafloor, University of Canterbury, Department of Electrical and Electronic Engineering, Private Bag. Christchurch, New Zealand, Mar. 30, 1988, J. Acoustical. Society of America. 84 (4), Oct. 1988, pp. 1456-1477.*
Guy J. Brown, Separation of Speech by Computational Auditory Scene Analysis, Reprinted from Speech Enhancement, J. Benesty, S. Makino and J. Chen (Eds.), Springer, New York, 2005, pp. 371-402.*
Swift, et al. 1996. "Tracking weak targets with a grid search approach using spatially distributed sensors." Data Fusion Symposium. ADFS '96, First Australian Adelaide, SA, Australia, Nov. 21-22, 1996. pp. 7-12.
Donati, et al. 2005. "Target motion analysis and track association with a network of proximity sensors." Information Fusion 7(3): 285-303.

* cited by examiner

Primary Examiner — Tung S Lau
(74) Attorney, Agent, or Firm — Stroock & Stroock & Lavan LLP

(57) ABSTRACT

The present invention relates to the field of data merging, the term "data" encompassing "observation data". It relates notably to the data obtained from processing of sonar, radar or optronic signals. The subject of the invention is a method for carrying out the spectral merging and characterization of tracks, each track including the data relating to the evolution over time of the bearing position and of the Doppler frequency of an assumed object. This method includes: a first step of merging the initial tracks which correspond substantially to identical observation directions (azimuths); and a second step of frequency analysis of the tracks resulting from merging the initial tracks and of characterizing the merged tracks whose spectrum takes the form of a harmonic comb characteristic of a single real object. The invention finds for example its application in data merging and echo classification, for narrowband passive sonar applications.

11 Claims, 8 Drawing Sheets

Figure 1:
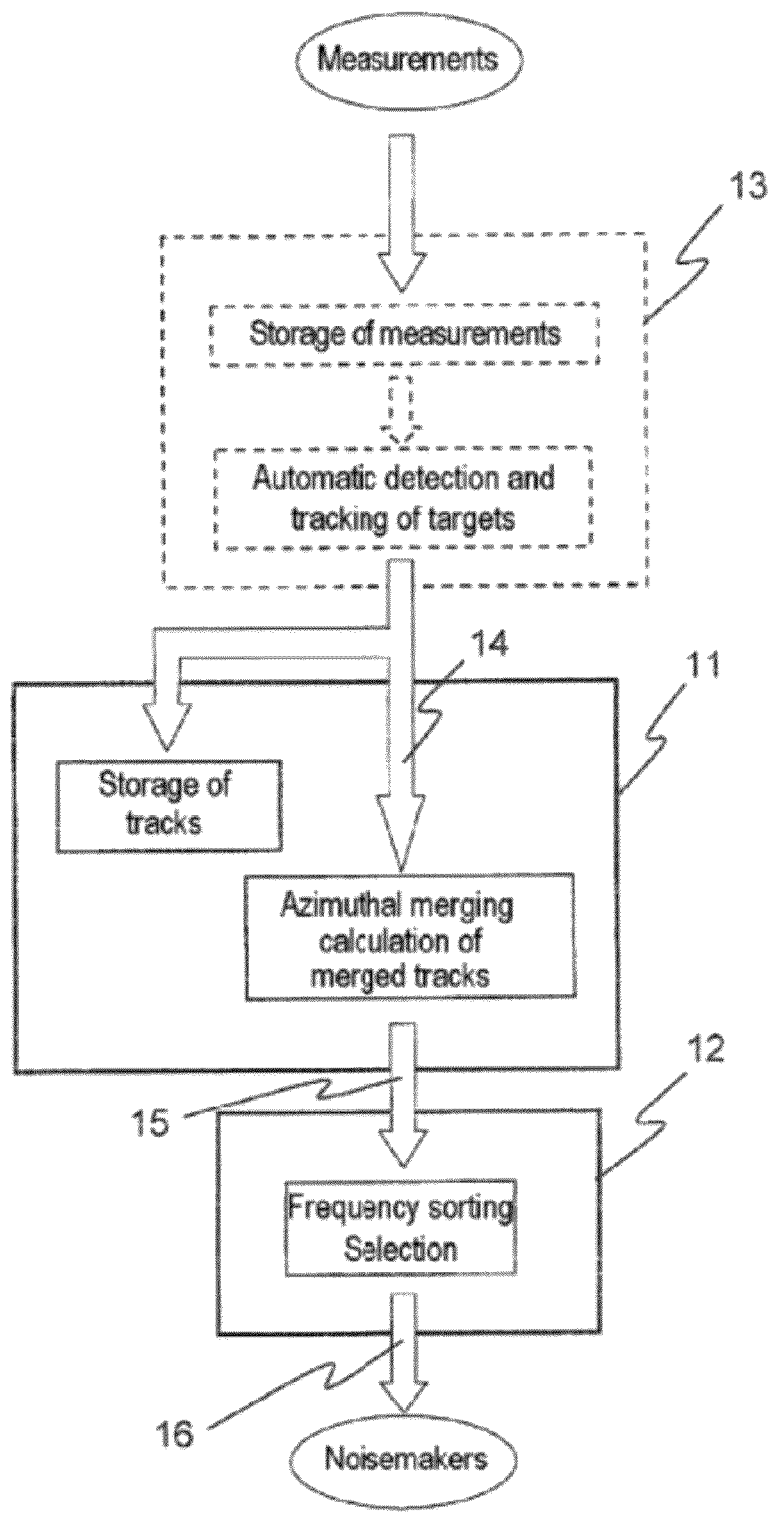
Figure 2:
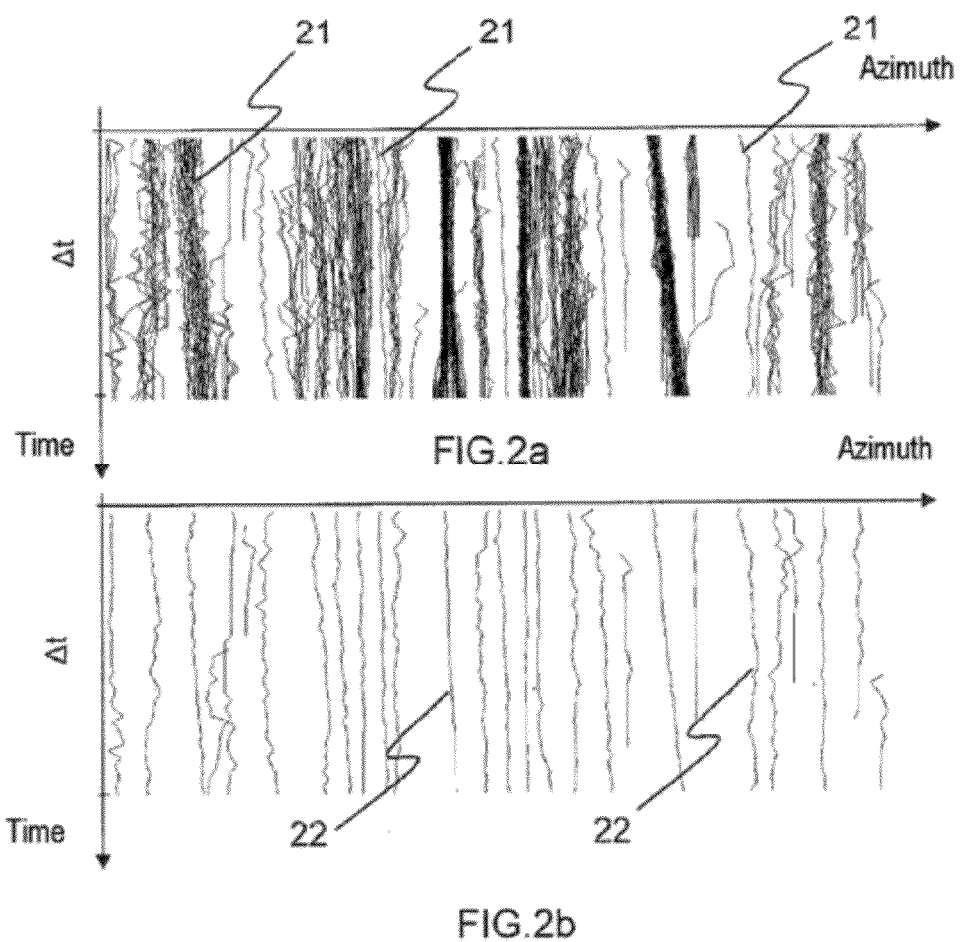
Figure 3:
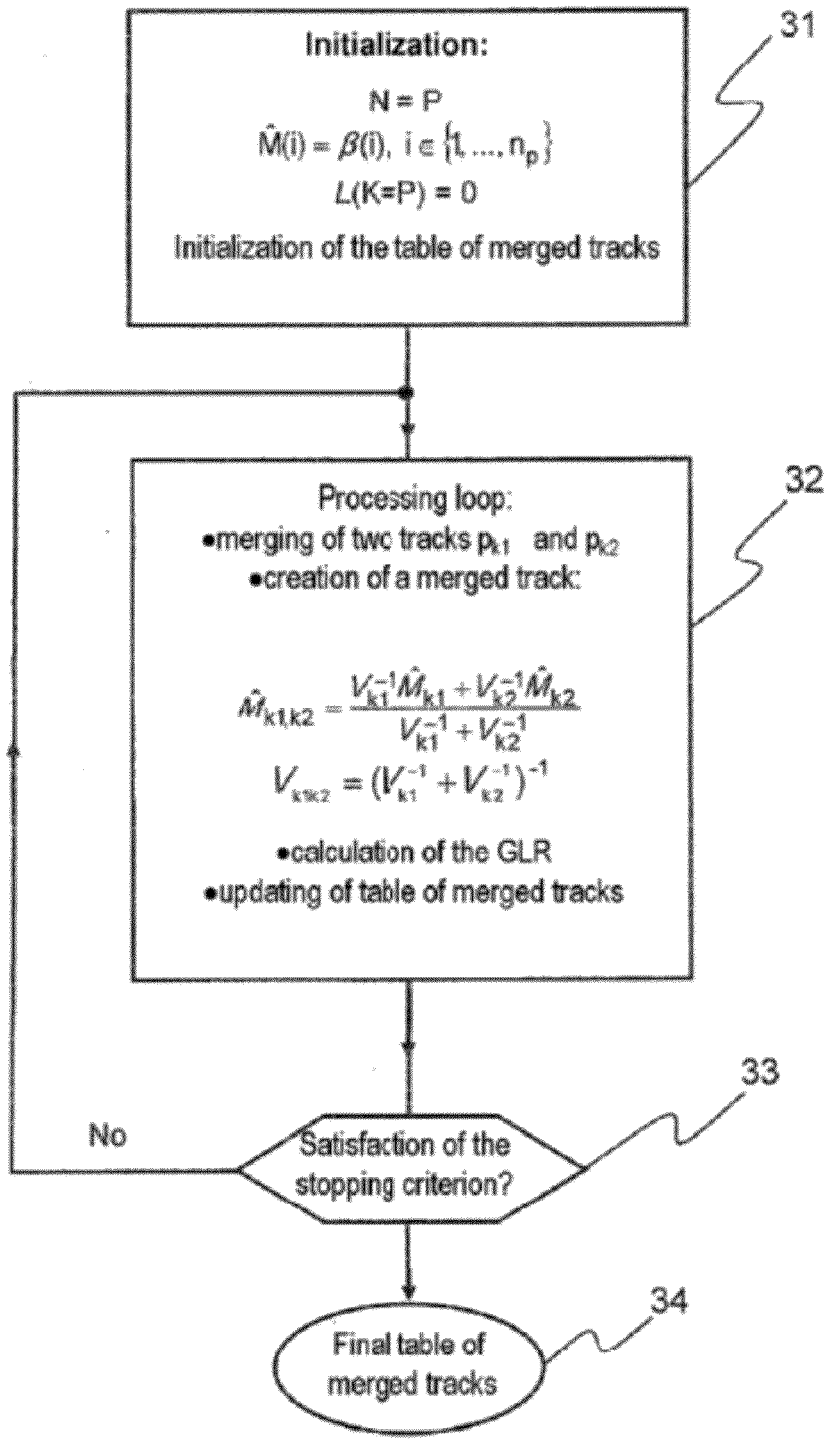

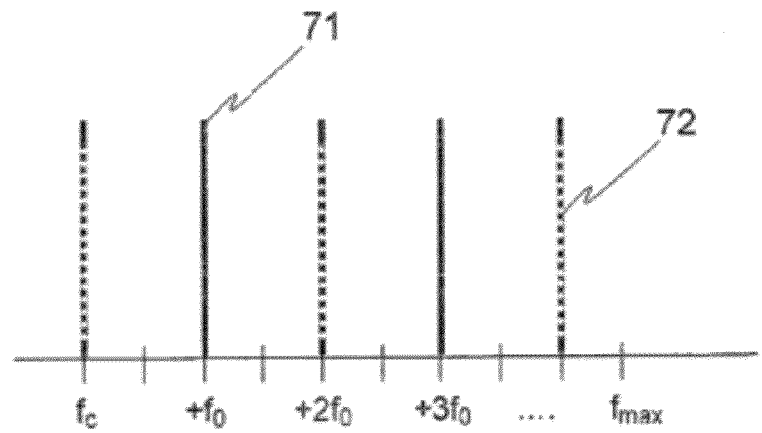
FIG.7-1
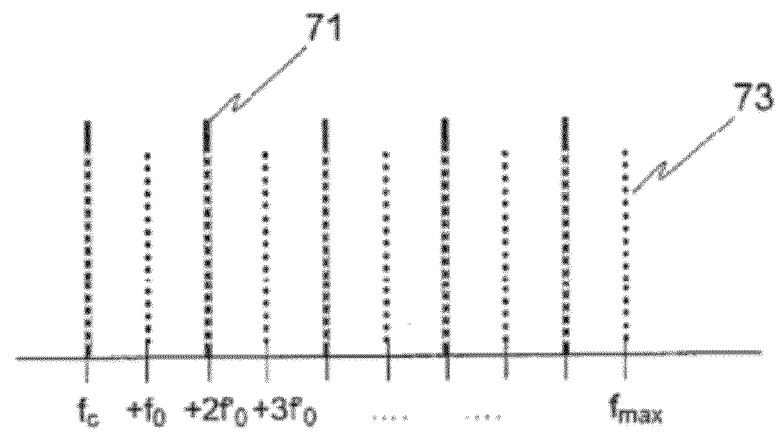
FIG.7-2
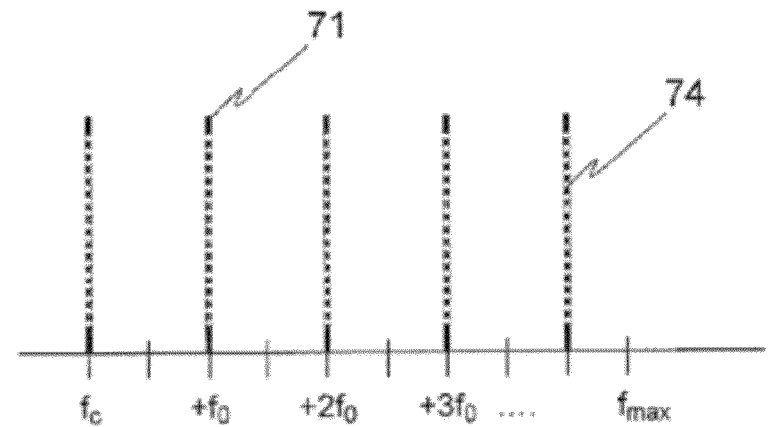
FIG.7-3
FIG.7

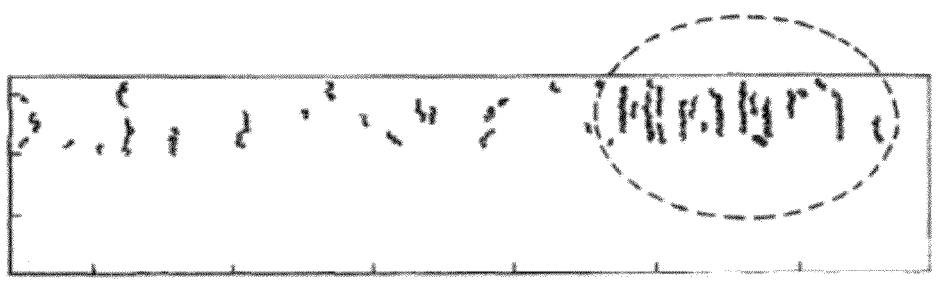
FIG.8-1
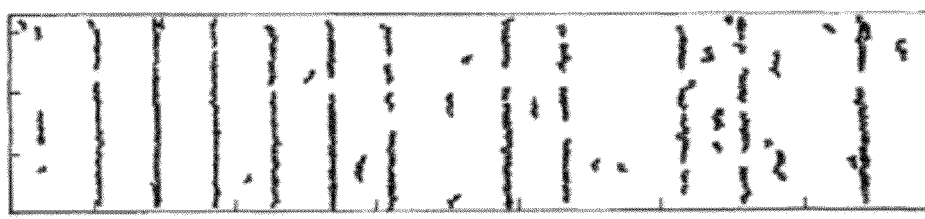
FIG.8-2
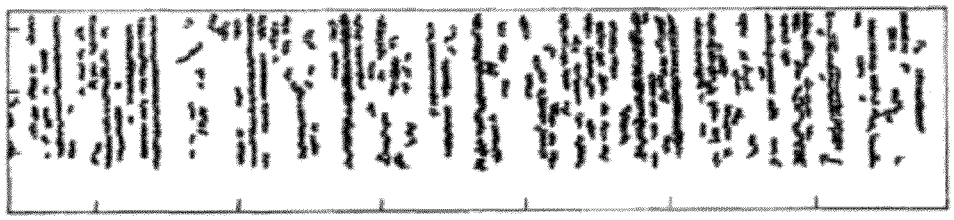
FIG.8-3
FIG.8

AUTOMATIC PROCEDURE FOR MERGING TRACKS AND ESTIMATING HARMONIC COMBS

CROSS REFERENCE TO RELATED APPLICATIONS

The present application is the U.S. National Phase of International Patent Application Ser. No. PCT/EP2008/052024, filed on Feb. 19, 2008, which claims the benefit of French Patent Application Ser. No. 07/01406, filed on Feb. 27, 2007, both of which are hereby incorporated by reference in their entireties.

The present invention relates to the field of signal processing and more particularly data merging, the term "data" being taken within the broad sense of "observation data". It relates notably to the data obtained on the basis of the processing of sonar, radar or optronic signals. The invention finds for example its application in data merging and echo classification, for narrowband passive sonar applications.

Data merging is a very general problem applied to numerous fields in signal and data processing within the broad sense (radar, SONAR, optronics, etc.). Specifically, with the increase in observation and measurement means (ever more numerous and efficacious sensors) it becomes necessary to avail oneself of automatic analysis and merging means making it possible to utilize in an optimal manner, that is to say conjointly, the whole set of data collected. Generally, data merging consists in associating in one and the same set distinct data nevertheless exhibiting a certain proximity, this proximity being characterized by determined criteria. However, such data merging cannot always be carried out in a simple manner and poses several problems.

Thus, it is in particular difficult to determine the way to take best account of the measurements originating from the various sensors, knowing that the sensors do not perceive the same things at the same instants. The various measurement noises can for example have different levels, and this may cause, in certain circumstances, an absence of measurements for certain sensors. The merging of the data must then be performed taking account of the absence of data originating from these sensors.

It is, furthermore, also difficult to limit the complexity of implementing the merging algorithms generally used, as the number of sensors involved, and therefore the number of data items to be merged, increases.

In the current state of the art, various procedures are proposed for attempting to solve the problems posed by data merging. These procedures use either a deterministic approach, through combinatorial optimization for example, or a statistical approach based on decision theory, or else an approach which may be dubbed fuzzy, based for example on implementing neural decision nets. However, it seems that the statistical approach to problems related to data merging is well suited. Specifically it leads to relatively simple and conventional modelling of the measurement errors in contradistinction to deterministic, procedures. Moreover the statistical approach provides a solid theoretical framework, based on estimation and decision theory, for treating data merging problems. Furthermore this approach does not raise any additional problems of training-based data acquisition in contradistinction to the fuzzy approaches leading to the implementation of neural nets.

Concerning the statistical approach to solving problems related to data merging, the procedures proposed at the present time make it possible mainly to perform data merging relying on reconciliation based on a particular criterion. Specifically, reconciliation based on several distinct criteria is generally excluded on account of the excessive complexity of implementing the merging algorithms used, when several criteria are taken into account. Thus for example, in the particular field of detection (radar, sonar or optronic detection), merging relates mainly to the associating, according to the azimuthal proximity criterion alone, of tracks formulated on the basis of the echoes received from the observed space.

An aim of the invention is to propose a data merging procedure, usable in particular, but not only, to perform the merging of sonar tracks, making it possible to exploit a statistical approach while also making it possible to base the merging of the data on the consideration of several proximity criteria, the azimuth and the frequency for example. Another aim of the invention is to propose a procedure whose execution is automatic and does not require the intervention of an operator. Yet another aim is to propose a procedure not requiring the implementation of training. For this purpose the subject of the invention is a method for merging a set of initial tracks, each initial track consisting of the data characterizing the evolution, over time, of the position and of the Doppler frequency of an assumed object, as well as the automatic analysis and sorting of the resulting tracks formed after merging the initial tracks, the method comprising a prior step of constructing the initial tracks, the method being characterized in that it furthermore comprises:

a first step of spatially associating the initial tracks which performs the grouping of the initial tracks corresponding substantially to identical observation directions (azimuths) so as to form merged tracks,
  a second step of frequency analysis of the merged tracks which performs the selection of the merged tracks whose spectrum takes the form of a harmonic comb characteristic of a single real object.

According to the invention, the steps of the method are applied to data constituted on the basis of measurements carried out for time intervals of given duration $\Delta t$.

Figure 4:
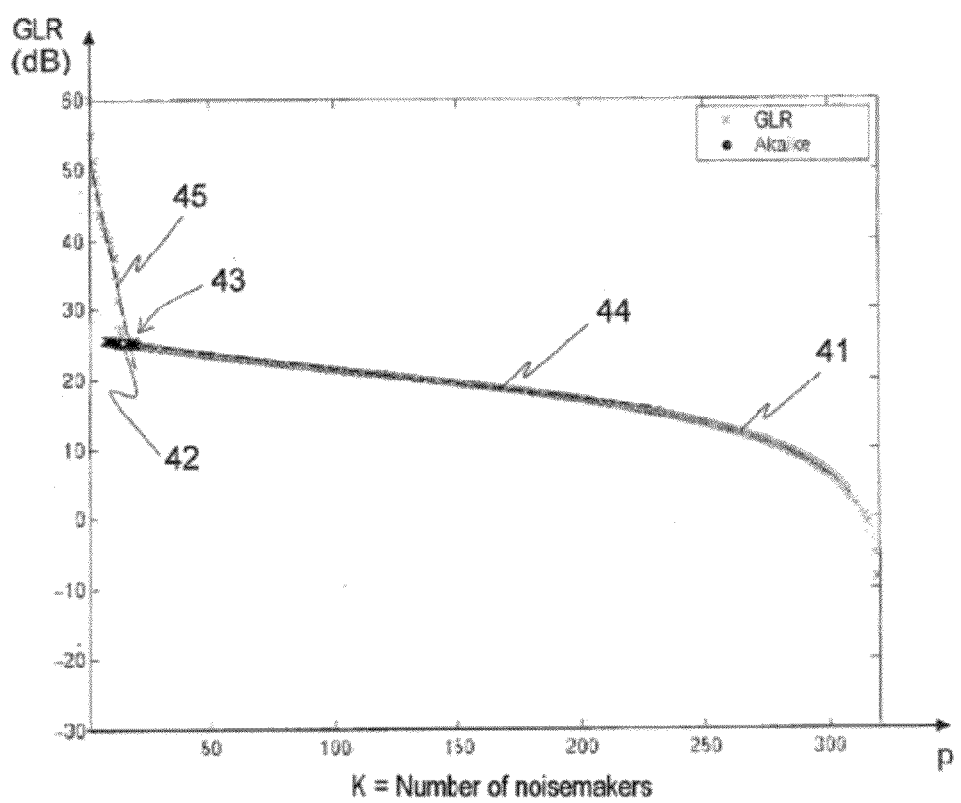
Figure 5:
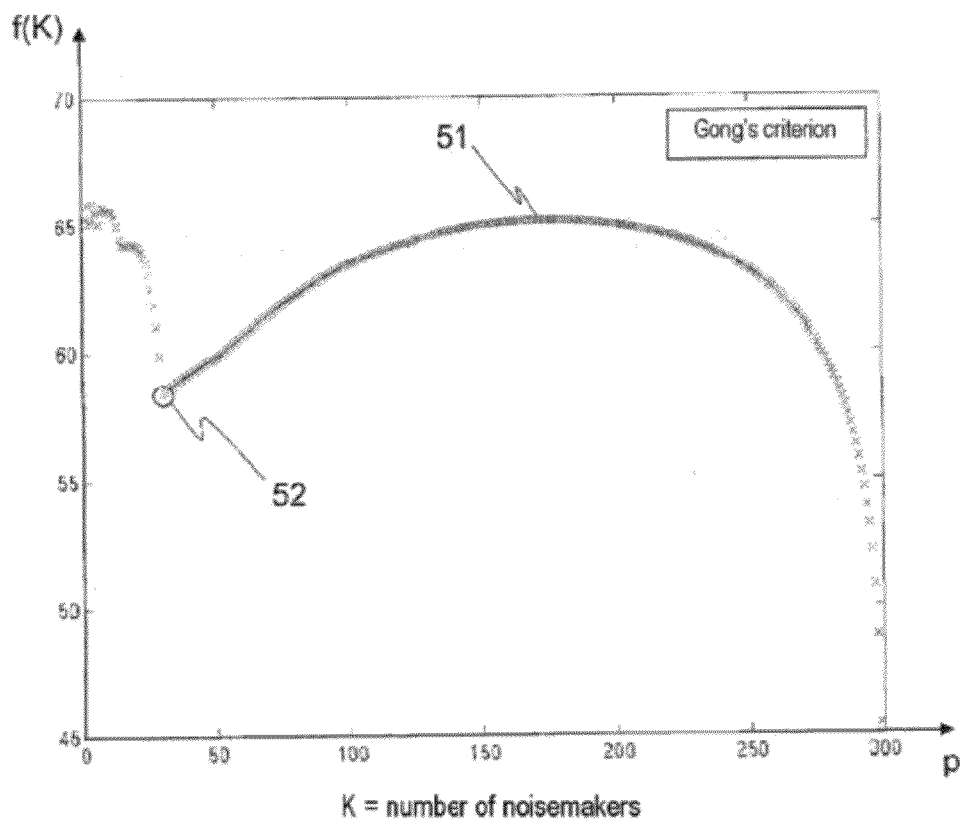
Figure 6:
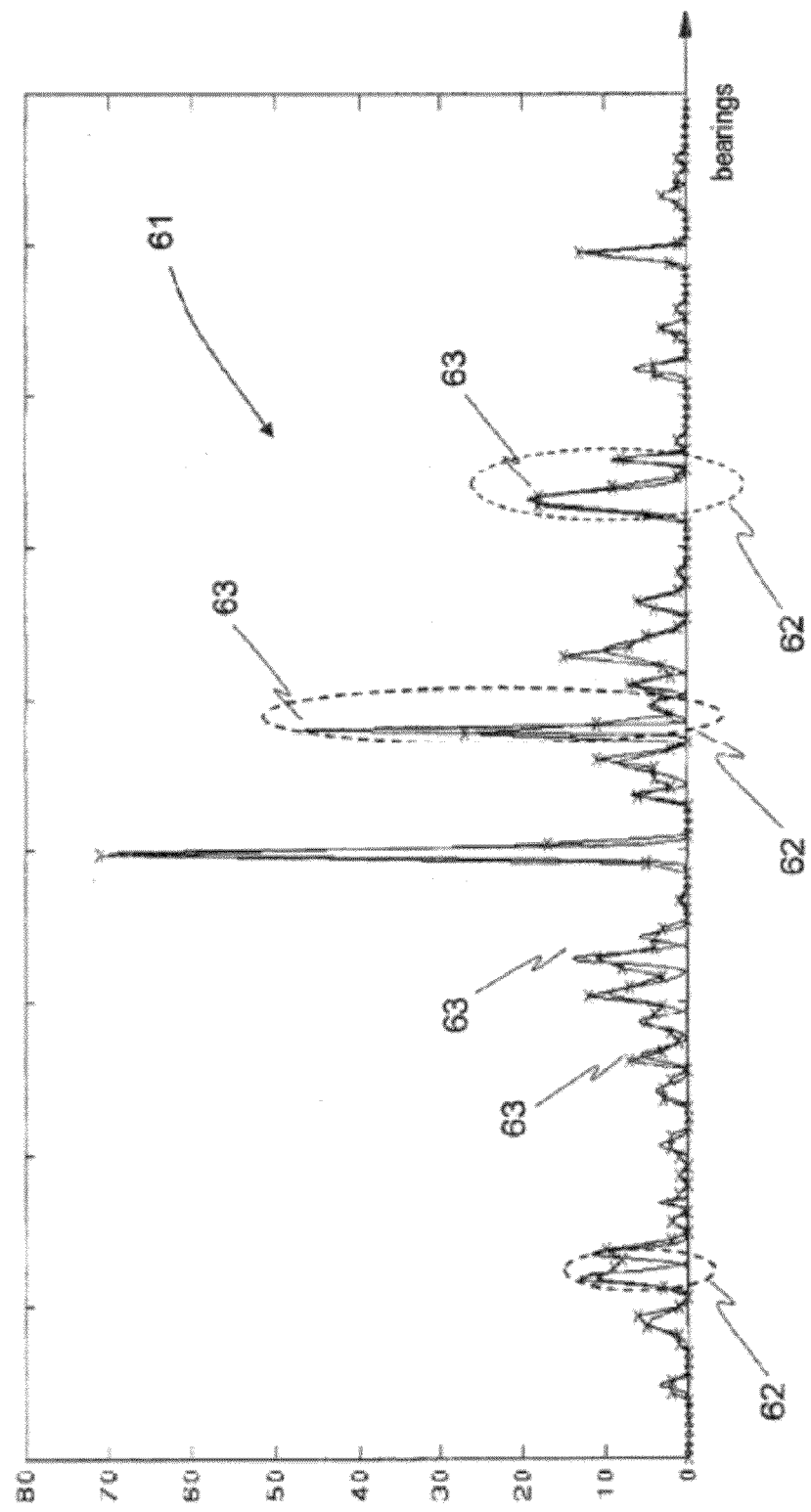

The characteristics and advantages of the invention will be better appreciated by virtue of the description which follows, which description sets out the invention through particular modes of implementation, taken as non-limiting examples and which is supported by the appended figures, which figures represent:

FIG. 1, the basic flowchart of the method according to the invention,

FIG. 2, an illustration of the object of the first step of the method according to the invention, FIGS. 3 to 5, illustrations relating to a first form of implementation of the first step of the method according to the invention, FIG. 6, illustrations relating to a second form of implementation of the first step of the method according to the invention, FIGS. 7 and 8, illustrations relating to the second step of the method according to the invention.

As stated previously, the method according to the invention applies generally to the merging of all types of data, consisting of sets of values conveying various evolutions, over time for example, of one or more quantities. The merging of these data then consists in inter-associating the data exhibiting similarities so as to form a single resulting datum. The number of data to be processed is thus decreased by avoiding having to consider separately two data conveying similar evolutions of the quantity considered. However, with a view to clarity, the method according to the invention is presented subsequently in the description through its application to the merging of tracks constructed on the basis of the data originating from an electromagnetic or acoustic sensor, and more particularly a passive sonar performing the narrowband analysis of the signals emitted by noisemakers situated in the space covered by the sensor.

The data mentioned above are then the primary tracks, constituted by the sonar equipment recurrence after recurrence, on the basis of the azimuth values for which echoes are detected. These tracks characterize the evolution over time, in azimuth and in Doppler frequency, of potential noisemakers, knowing that several tracks can be associated with a given real noisemaker, the potential noisemakers associated with these tracks forming only one and the same real noisemaker. The operating principle as well as the characteristics of the method according to the invention are therefore presented here in the application of this method to the merging of primary tracks obtained by an arbitrary tracking method.

Attention is turned initially to FIG. 1, which presents the basic flowchart of the method according to the invention.

As illustrated by the figure, this method comprises two processing steps.

During the first step 11, a processing which performs an azimuthal merging of the tracks judged angularly close is applied to the primary tracks 14 formulated beforehand by the sensor. The primary tracks 14 demarcate the evolution of the position in bearing of potential noisemakers. The processing produces merged tracks 15, each merged track corresponding to an assumed object capable of producing the various noises corresponding to the primary tracks 14 that have been merged. According to the invention, two distinct primary tracks are merged if the measurement of the angular deviation which separates them is judged less than a limit value beyond which the tracks can no longer be considered to be capable of representing one and the same real noisemaker.

During the second step 12, a refinement of the results produced by the first step is performed for each noisemaker. This refinement consists in considering the spectrum corresponding to each merged track 15 and in identifying as far as possible this spectrum with a model spectrum formed of a comb of harmonic frequency components (spectral lines) and in determining on the basis of this identification the coarse nature of the corresponding noisemaker. On completion of this second step 12, an estimation of the composition and form of the spectrum of the noisemaker considered is obtained, which estimation allows a first characterization of the noisemaker.

According to the invention, the first step, azimuthal merging step, is applied to primary tracks 14 already formed. These tracks are constructed during a preliminary step 13, on the basis of azimuth and frequency measurements performed on echoes during a given time interval. Each primary track associates an azimuthal track, which track groups together all the signal level measurements performed during a given time interval for a given azimuth and a frequency track, which track groups together all the frequency measurements performed in the same time interval for the same azimuth considered. The first step of the method according to the invention therefore involves the azimuthal tracks.

The primary tracks can be formulated by any known means, for example by implementing a method of "automatic detection and tracking" type or "ADT". FIG. 2a gives an exemplary graphical representation of such tracks 21, over a processing time interval, of duration $\Delta t$, in an azimuth-time space. FIG. 2b, for its part, gives a representation of the merged tracks 22 obtained by applying the merging step to the tracks represented in FIG. 2a.

According to the invention, the steps of the method are applied to primary tracks constructed on the basis of groups of measurements carried out over a time interval of given duration $\Delta t$. Thus the method therefore merges and sorts tracks over a limited duration $\Delta t$. Hence, when the merge and sort operations are completed for a considered block of measurements, the operation is repeated on the block of measurements corresponding to the following time interval $\Delta t$. The method thus carries out blockwise data processing. Hence, the tracks maintained over a more significant number of recurrences are analysed piecewise.

To implement the first step of the method according to the invention it is therefore necessary to implement a tool, a calculation procedure, making it possible to determine which primary tracks can be merged in azimuth to form a single track and which tracks are not capable of being merged. This determination is carried out here by analysing the proximity of the primary tracks with respect to one another. To carry out this merging, several procedures are naturally conceivable. However, subsequently in the description two original procedures are presented. They correspond to two preferred forms of implementation of the method according to the invention.

A first procedure consists, as illustrated by FIG. 3, in performing in an iterative manner the merging of the tracks pairwise, by merging at each iteration the two tracks that are closest together in azimuth. These two tracks can, according to the iteration considered, be two initial tracks, an initial track and a track already resulting from the merging of other tracks or else two tracks already resulting from the merging of other tracks. The iterative merging mechanism comprises a stopping test making it possible to halt the merge. The latter is stopped when for a given iteration the two closest tracks are nevertheless remote in azimuth by a value exceeding a fixed threshold. Henceforth, the iteration process being halted, the remaining groups of tracks are considered to represent as many distinct noisemakers. The principle of implementation of this first procedure relies on the Modelling described hereinafter.

Initially P azimuthal tracks are available, formulated on the basis of the Signals originating from noisemakers, the number of which, N, is unknown. The objective of the first step therefore consists in determining the number N of noisemakers by merging the tracks liable to belong to one and the same noisemaker, the number of tracks resulting from each iteration iteratively approaches N.

We denote by $P_i$, $i \in \{1, \ldots, P\}$, the set of tracks to which the method is simultaneously applied. Each track $p_i$ consists of $n_i$ azimuth measurements. The tracks $p_i$ are assumed to be independent and follow normal laws in azimuth. $N_i(M_{k(i)}, C_i)$, in which $M_{k(i)}$ is the unknown mean vector. $k(i)$ is here a permutation which with each track $p_i$ associates the number, unknown a priori, of the noisemaker from which it arises. $C_i$ is for its part the associated covariance matrix (diagonal matrix), of dimension $n_i \times n_i$.

The probability P that the tracks arise from a given partition of the set of tracks under the permutation k, is given by the following relation (probability of a given partition):

$$P(p_1, \ldots, p_P/k(1), \ldots, k(P)) = \prod_{i=1}^{P} P(p_i/k(i)) \quad [1]$$

$$= \prod_{i=1}^{P} \frac{1}{(2p)^{n_i}|c_i|^{1/2}} \cdot \exp\left(-\frac{1}{2}(p_i - M_{k(i)})' \cdot C_i^{-1} \cdot (p_i - M_{k(i)})\right)$$

$$= K_1 \cdot \exp\left(-\frac{1}{2}\sum_{i=1}^{P}(p_i - M_{k(i)})' \cdot C_i^{-1} \cdot (p_i - M_{k(i)})\right)$$

in which $(p_i-M_{k(i)})'$ represents the transposed matrix of the matrix $(p_i-M_{k(i)})$, and in which the values $M_{k(i)}$ are unknowns.

Hence, to decide that a partition of the tracks is performed into K noisemakers (k(i) comprising K elements) or into K−1 noisemakers (k(i) then comprising K−1 elements), that is to say to decide whether an additional merge is performed, the generalized likelihood ratio is considered, defined by the following relation:

$$GLR(p_1, \ldots, p_P) = \frac{\max_{l \in k(K)} P(p_1, \ldots, p_P/k_l(1), \ldots, k_l(P))}{\max_{l \in k'} P(p_1, \ldots, p_P/k'_l(1), \ldots, k'_l(P))} \quad [2]$$

where the numerator corresponds to the maximum over the set of the partitions with K elements of the probability of a partition with K elements (k(K) represents the possible set of the partitions of the set of P tracks into K noisemakers) and where the denominator corresponds to the maximum over the set of the partitions with K−1 elements of the probability of a partition with K−1 elements (k'(K−1) represents the possible set of the partitions of the set of P tracks into K−1 noisemakers).

It should be noted that in this context, the mean values $M_{k(i)}$ which make it possible to calculate the probabilities P are not known. They are therefore replaced with their estimates $\hat{M}_{k(i)}$.

Hence, by putting:

$$L(K) = c + \sum_{i=1}^{P}\left(p_i - \hat{M}_{k_M(i)}\right)' C_i^{-1}\left(p_i - \hat{M}_{k_M(i)}\right) \quad [3]$$

where $k_M$ represents the permutation $k_l$ making it possible to obtain the maximum value of the probability P, the following relation is obtained:

$$-2 \ln GLR(p_1, \ldots, p_P) = L(K) - L(K-1). \quad [4]$$

The number of primary tracks formulated is generally significant, so that the total number of partitions with K elements is itself very large.

If the tracks are merged by performing a so-called "ascending" search, one starts from the configuration where each track is a noisemaker and one proceeds, by a succession of iterative merges, towards a configuration where the noisemakers are composed of several tracks, by aggregating two elements. The possible number $C_P$ of paths, that is to say the number of possible different groupings to be analysed to determine the number of noisemakers giving rise to the P tracks, is then equal, in a known manner, to:

$$C_P = C_P^2 \cdot C_{P-1}^2 \ldots C_2^2 = \frac{P!(P-1)!}{2^{P-1}} \quad [5]$$

where P represents as previously the number of tracks.

Hence, when the number of tracks is large, an exhaustive ascending search is impossible. On the other hand, it is possible to substitute it with a compatible partition-based suboptimal hierarchical search. This search consists in aggregating in an iterative manner two elements at each iteration, so as to form a new partition, without jeopardizing the partitions carried out at the previous iterations (i.e. the new partition is compatible with the previous one). For this type of search, the number $C'_P$ of possible paths is advantageously equal to:

$$C'_P = C_P^2 + C_{P-1}^2 + \ldots + C_2^2 = \frac{P(P-1)(P+1)}{6} \quad [6]$$

As may be noted, $C'_P$ is much less than $C_P$, so that the number of noisemakers and of partitions per noisemaker to be studied to perform the merging of the initial tracks and calculate the ratio GLR remains compatible with the computational capabilities of current computers.

In addition to the appreciable decrease in the number of possible path analyses to be performed, the use of a compatible partition-based, iterative, hierarchical search procedure furthermore makes it possible to represent the term L(K) in the following recursive form:

$$L(K-1) = L(K) + \min_{l_1, l_2}\left\|\hat{M}_{l_1} - \hat{M}_{l_2}\right\| \quad [7]$$

where $M_{I1}$ and $M_{I2}$ respectively represent the mean vectors representing the two tracks merged during the iteration considered.

The number K of noisemakers being thus decreased by 1 at each iteration, merging is therefore carried out gradually.

The principle described in the previous paragraphs is at the basis of the processing algorithm, illustrated by FIG. 3, implemented in a first preferred form of implementation of step 1 of the method according to the invention.

This algorithm conventionally comprises two phases: an initialization phase 31 and a looped processing phase 32. The processed data are the initial tracks, provided by the ADT processing of the system implementing the method according to the invention for example. Each initial track thus consists of the grouping of a certain number of azimuth measurements performed on the signal samples detected by the system.

According to the invention, the algorithm implemented performs a batch processing of the data constituting the various tracks, each batch corresponding to a determined number of measurement recurrences.

It is recalled here that the analysis of the signal received is carried out in a periodic manner and that for each measurement instant, or recurrence, the analysis is performed on the azimuth axis of the received signal. Thus an initial track consists of a set of measurements corresponding to successive recurrences, which have been associated by the tracking means (ADT) of the system implementing the method according to the invention. Hence, if the group of measurements which constitutes the batch comprises N measurements, a given initial track consists, in its simplest form, of a vector comprising n components, the number n being able theoretically to vary from 1 to N.

During the initialization phase, the number K of noisemakers corresponding to the P initial tracks provided by the ADT processing is initialized to the value K=P. A single partition into as many noisemakers as initial tracks is therefore considered initially.

During the initialization phase, an initial estimated mean value $\hat{M}$ is furthermore defined for each track p. This mean value can be defined in a vector form, the components of this initial vector then being expressed as:

$$\hat{M}(i)=\beta(i), i\in\{1,\ldots,n_p\}, \quad [8]$$

where $n_p$ represents the number of azimuth measurements constituting track p and where $\beta(i)$ represents the value of the i-ith azimuth measurement constituting track p.

This mean value can also be defined in a more exhaustive, but also more complex manner, in the form of a vector whose components are expressed as:

$$\hat{M}(i)=(\beta^0, \dot{\beta}) \quad [9]$$

where $\beta^0$ corresponds to the corresponding azimuth measurement for track p at the central recurrence of the batch and where $\dot{\beta}$ corresponds to the slope of the variation (i.e. to the slew rate) of the azimuth measurements over the time interval corresponding to the N recurrences of the batch.

This mean value can even be defined, in an even more exhaustive and even more complex manner, in the form of a vector whose components are expressed as:

$$\hat{M}(i)=\beta(i),\beta^0,\dot{\beta}), i\in\{1,\ldots,n_p\} \quad [10]$$

During this phase, a table of tracks is initialized. It contains for each track the set of data relating to the track. Each track p is thus characterized by its parameters and by its rank in the table. Thus for example, the track $p_k$ of rank k in the table is characterized by its parameters $\hat{M}_k$ and $V_k$.

Here $V_k$ represents the variance, with components $V_k(i)$, associated with the track $p_k$. Each component $V_k(i)$ is the variance of the measurement i belonging to the track $p_k$.

During the initialization phase the value of the quantity L(K) is furthermore initialized to zero. We thus have:

$$L(K=P)=0. \quad [11]$$

The object of the looped processing phase is to perform in an iterative manner the merging of the tracks. According to the invention this merging is carried out gradually in a hierarchized manner. At each iteration, the two tracks that are closest in azimuth are merged. Hence the number of noisemakers initially equal to the number P of initial tracks decreases by one unit at each iteration.

For this purpose, each iteration of the looped processing phase, on the one hand a search is conducted for the two closest tracks $p_1$ and $p_2$, then these two tracks are merged.

According to the invention the two closest tracks $p_{k1}$ and $p_{k2}$ are defined by the following relation:

$$(k1,k2) = \underset{1\leq k1<k2\leq K}{\operatorname{argmin}} \left\| \hat{M}_{k1} - \hat{M}_{k2} \right\|^2_{V_{k1}+V_{k2}} \quad [12]$$

where $\hat{M}_{k1}$ and $\hat{M}_{k2}$ represent the estimates of the means $M_{k1}$ and $M_{k2}$ of the tracks $p_{k1}$ and $p_{k2}$ considered.

A search is thus conducted in the table of current tracks for the two tracks, of ranks k1 and k2, providing the smallest normalized deviation between their means from among all the deviations calculated for all the tracks taken 2 by 2.

The merging of the two selected tracks is carried out thereafter, which merging results in the disappearance of the two tracks $p_{k1}$ and $p_{k2}$ as such and in the creation of a merged track whose parameters are the following:

$$\hat{M}_{k1,k2} = \frac{V_{k1}^{-1}\hat{M}_{k1} + V_{k2}^{-1}\hat{M}_{k2}}{V_{k1}^{-1} + V_{k2}^{-1}}, \quad [13]$$

and $$V_{k1k2} = (V_{k1}^{-1} + V_{k2}^{-1})^{-1} \quad [14]$$

Hence, the table of merged tracks is modified. It has K−2 tracks that are unchanged with respect to the previous iteration, and a new track, the tracks then being numbered from 1 to K−1. K−1 independent noisemakers are thus identified.

Hence, the iterative process of azimuthal merging of tracks pairwise continues as long as the looped processing phase lasts. However the object of the method not being to merge the set of initial tracks into a single noisemaker, but to group together the initial tracks provided by the tracking method, into groups representing separate noisemakers, it is necessary to define a condition-based operation 33 for stopping this iterative processing. For this purpose the generalized likelihood ratio GLR is advantageously used, the value of which is calculated in a recursive manner at each iteration. This value is calculated at each iteration on the basis of the following relation:

$$L(K-1)=L(K)+\|\hat{M}_{k1}-\hat{M}_{k2}\|^2 v_{k1}+v_{k2} \quad [15]$$

where $$\|\hat{M}_{k1}-\hat{M}k2\|^2 v_{k1}+v_{k2}$$

represents the normalized deviation between the estimated values of the means of the two tracks merged in the course of the iteration considered. L(K), which corresponds to the expression for the GLR, appears here as a decreasing function of K, the consequence being that, K decreasing as the iterations proceed, GLR increases at each iteration. Hence, the value of GLR, or more exactly the value of −2 Log GLR (i.e. that of −2 Log [L(K)]), is thereafter compared with a threshold which defines the maximum acceptable value of GLR, which maximum value conveys a maximum angular deviation making it possible to justify the merging of two tracks. When the threshold is attained the looped processing phase is completed and a distribution of the P initial tracks as N merged tracks corresponding to N distinct noisemakers is then obtained. These merged tracks are stored in a table 34 containing for each track the parameters $\hat{M}$ and $\hat{V}$ relating to the representative of the merged track and moreover the spectral components of each of the tracks that contributed to the construction of the merged track.

To determine whether the ratio GLR attains a maximum value, or, stated otherwise, if the merging of tracks is no longer justified and if the looped processing step should be halted, it is possible to use various procedures.

A first procedure illustrated by FIG. 4 consists in using Akaike's criterion and in considering the function f(K)=−2 Log(GLR)=−2 Log(L(K)) represented by the curve 41 in the figure. This function is asymptotically distributed according to a centered $\chi^2$ law, with d=(N−k)×n degrees of freedom, where n is the number of measurements used to calculate the distance between two tracks or, stated otherwise, the size of the state vector which constitutes a track. This number corresponds to the number of recurrences common to the two tracks considered, to which the merging algorithm is applied.

According to this first procedure, the merging operation is halted when, for a given iteration, the value of the function f(K)=−2 Log(GLR) attains the $\chi^2$ value represented by the point 42 in the figure.

A second procedure also illustrated by FIG. 4, implements a geometric processing consisting in determining the point of intersection 43 of the tangents, 44 and 45, to the curve representing the function f(K)=−2 Log(GLR)=−2 Log [L(K)]. According to this procedure, the merging operation is halted when, for a given iteration, the value of the function f(K)=−2 Log(GLR) attains the value of the point of intersection 43.

Yet another procedure, illustrated by FIG. 5, uses Gong's criterion consisting in searching for a minimum of the function $g(K)=K^2(2 \text{Log}(GLR))=K^2(2 \text{Log}(L(K)))$, in which K represents the number of noisemakers considered. According to this procedure, the merging operation is halted when, for a given iteration, the value of the function f(K) attains the value corresponding to the point 52 of curve 51, point corresponding to the point of inflection of f(K) for the number of noisemakers considered.

It should be noted here that, according to the invention, two distinct tracks can be candidates for merging if they have at least n recurrences in common (in practice n=1) or stated otherwise if the corresponding state vectors have components arising from the same measurement recurrences.

The variance, $V_k(i)$, associated with each azimuth measurement $\beta(i)$ is given by an approximation of the Cramer-Rao bound of the estimator of the measurement which depends on the signal-to-noise ratio of each measurement and the angular aperture $\theta_3$ of the antenna used:

$$V_k(i) = \frac{\theta_3^2}{s_k(i)}, \quad [16]$$

When two tracks k1 and k2 are merged for a given iteration, the track arising from the merge has as mean and variance the means and variances as expressed in the description of the algorithm. This expression is, of course, valid only on the track part common to the two tracks, but the merged track consists of a number of measurements that is equal to the union of the two tracks. Therefore on the parts of track not common to the two tracks, the means and variances take the values of the means and variances of each of the corresponding tracks.

It should also be noted that when the estimation $\hat{M}(i)$ of the mean M(i) is carried out with the aid of $\beta^0$ and $\dot{\beta}$, this estimation is done batch-wise by a linear regression.

The track merging procedure described in the previous paragraphs advantageously makes it possible to perform a hierarchized gradual merge which avoids having to analyse all the possible arrangements of the initial tracks to find the most probable arrangement, corresponding to a given number of noisemakers.

This procedure presented by way of example and of preferred mode of implementation is however not the only one which makes it possible to implement the first step of the method according to the invention, an essential characteristic of which is that it carries out the merging of the initial tracks as a function of their relative proximity in azimuth with respect to one another, this proximity being assessed through a statistical parameter.

To implement the first step of the method according to the invention it is thus possible to use in an alternate manner other procedures, in particular the histogram procedure presented subsequently in the description and illustrated by FIG. 6. This alternate procedure can be described as follows.

As for the procedure described previously, the input data utilized are the azimuthal initial tracks provided by the tracking method used (ADT for example). The tracking method generally provides a set of tracks in bearing and in frequency, constituted on the basis of the signals detected, the object of the first step of the method being to perform the merging of some of these tracks, based solely on the bearing information. The merging is done by data blocks, or batches, of limited duration, the merging of the tracks of a given block starting when the merging of the tracks constituting the previous block is complete. The successive batches may according to the case be contiguous over time or exhibit a certain overlap.

If $P_i, i\in\{1, \ldots, n\}$ denotes the set of tracks, each track i is defined, as previously, by $n_i$ azimuth measurements $M_i = (\beta_j^i)_{j=1, \ldots, n_i}$. The variance, ($V_i$), associated with each azimuth measurement, depends on the signal-to-noise ratio $s_i$ of each measurement and the value of $\theta_3$. Hence we may write:

$$V_i \cong \frac{\theta_3^2}{s_i} \quad [17]$$

In this other procedure, the bearing parameters, $(\beta_0)_{1, \ldots, n}$, and slew rate parameters, $(\dot{\beta})_{1, \ldots, n}$, of each of the tracks are estimated, by linear regression, the bearing parameters $(\beta_0)_{1, \ldots, n}$ being the bearing values at the centre of the data block considered. According to this procedure the merging is carried out by calculating the histogram 61 of the data $(\beta_0)_{1, \ldots, n}$. This histogram is approximated thereafter by a mixture of Gaussian laws 62, whose number, which corresponds to the number of merged tracks or else to the number of classes, is given by the number of local maxima 63 of the histogram. Once the mixture has been determined, the tracks are grouped together into merged tracks.

Hence, the merging of tracks by the histogram procedure can then be described, for each successive block (batch) by the following steps:

Step 1: estimation of $(\beta_0, \dot{\beta})_{1, \ldots, n}$.

Step 2: formulation of the histogram of the data $(\beta_0)_{1, \ldots, n}$, determination of the number K of classes (independent noisemakers) on the basis of the histogram and initialization of the algorithms for estimating the mixture of Gaussian laws, on the basis of the local maxima of the histogram of the $(\beta_0)_{1, \ldots, n}$.

Step 3: determination of the permutation k which with each track of rank i associates the noisemaker from which it arises.

Step 4: estimation of the parameters $(\hat{M}_i, \hat{V}_i)_{i=1, \ldots, K}$ representative of the tracks resulting from the merging (i.e. the "merged" tracks). We then have:

$$\hat{M}_i = \left(\sum_n Ind(k(n)=i)V_n^{-1}\right)^{-1}\left(\sum_n Ind(k(n)=i)V_n^{-1} \cdot M_n\right), \quad [18]$$
$$i=1, \ldots, K$$

and $$\hat{V}_i = \left(\sum_n Ind(k(n)=i)V_n^{-1}\right)^{-1}, i=1, \ldots, K \quad [19]$$

It should be noted that, in order for the estimation of $(\beta_0, \dot{\beta})_{1, \ldots, n}$ to make sense, it is necessary for the analysed tracks to be composed of at least 3 points. Furthermore, for the sake of effectiveness, just like for the hierarchized recursive merging procedure described previously, the tracks having a smaller number of points than a number N (N>3) are not taken into account. N depends here on the size chosen for the blocks (batches) and on the overlap between blocks. Thus for example, for blocks of 80 recurrences exhibiting overlap zones of 20 recurrences, we chose N=10.

It should also be noted that the choice of the spacing in the histogram is decisive for the determination of the number of classes and indirectly for the estimation of the parameters of the laws. The number of boxes in a histogram is a very general problem which has been the subject of various publications, it is in general related to the size of the sample making up the histogram. In our application we have chosen to relate it to the angular aperture $\theta_3$. We have then tested various spacings such as spacing=$c \times \theta_3$ with $$c = \left\{ \frac{2}{3}, \frac{3}{4}, 1 \right\}.$$

If it is compared with the iterative merging procedure previously described, the histogram procedure appears more direct and faster, since it is non-recursive and does not implement the test of a large number of possible partitions of the tracks. It furthermore makes it possible, on the basis of the histogram of the $\beta_0$, to determine, a priori, the number of noisemakers. Moreover, the principle thereof not being based on a calculation of the inter-track distances but on one grouping the tracks into classes corresponding to given angular sectors around class representatives, it makes it possible to group tracks together without it being necessary for the latter to comprise common points. However it is a procedure which turns out to be more fragile than the previous one. Specifically, in so far as this procedure estimates, on the basis of the observation, three parameters per class: conditional probability density $(m_i, \sigma_i^2)_{1,\ldots,K}$ and a priori probability $\pi_{1,\ldots,K}$, it is necessary for the observation (batch) to be of sufficient size and for the class to be sufficiently well represented.

As with the previous procedure, a distribution of the P initial tracks as N merged tracks corresponding to N distinct noisemakers is thus obtained. These merged tracks are stored in a table containing for each track the parameters $\hat{M}$ and $\hat{V}$ relating to the representative of the merged track as well as the frequency track of each of the initial tracks that participated in the merge. These frequency measurements constitute for each initial track the frequency track associated with the azimuthal track. The spectral components of each of the tracks having contributed to the construction of the merged track.

One of the characteristics of the azimuthal merging step of the method according to the invention being that the merging processing is performed on batches or blocks of data corresponding to a determined number of measurement recurrences, it is necessary to ensure continuity from one block to another in the merging operations carried out. Therefore, the method according to the invention follows the merging step with a step (comprises a) of inter-block processing.

The processing performed consists in matching the noisemakers obtained after merging on two successive blocks without jeopardizing the associations in each of the blocks. Hence the problem posed consists, by considering the sets of noisemakers $B_1 = \{b_i^1\}_{i=1,\ldots,N_1}$ and $B_2 = \{b_i^2\}_{i=1,\ldots,N_2}$ obtained on the basis of the method applied to two successive blocks, in seeking a set of noisemakers B where each noisemaker $b_i$ consists at most of two elements, a noisemaker of $B_1$ and a noisemaker of $B_2$.

To solve this problem the method according to the invention uses the same principle as that for merging tracks within a block. Hence, the distance criterion making it possible to decide whether two noisemakers may or may not be merged is based on the calculation of a generalized likelihood ratio.

In practice, the track merging step is carried out on data blocks exhibiting an overlap. Each block thus shares with the block which follows it a certain number of measurement recurrences. One thereafter carries out on the noisemakers arising from two successive blocks by implementing for example the iterative hierarchized merging procedure previously described, while complying however with the constraint of associating at most only two elements (noisemakers) originating from each of the blocks. Hence, the result obtained consists in the obtaining of unmerged noisemakers arising from one or the other of the blocks considered, i.e. in the obtaining of noisemakers resulting from the merging of a noisemaker arising from one of the blocks and of a noisemaker arising from the other block. The merging of the noisemakers of the two blocks is thus carried out in an iterative manner so that as long as a merge is possible, the number of noisemakers goes from K to K−1 by merging two noisemakers k1 and k2 belonging respectively to $B_1$ and $B_2$. Just as for the merging of tracks, the following operations are carried out:

Search for the 2 noisemakers, k1 and k2, to be merged:

$$(k1, k2) = \underset{1 \leq k1 < k2 \leq K}{\operatorname{argmin}} \left\| \hat{M}_{k1} - \hat{M}_{k2} \right\|^2_{V_{k1} + V_{k2}} \qquad [20]$$

Calculation of the distance $d_{k_1,k_2}$ between the two noisemakers:

$$d_{k_1,k_2} = |\hat{M}_{k_1} - \hat{M}_{k_2}|^2_{v_k + v_k} \qquad [21]$$

If $d_{k_1,k_2} \leq$ threshold then:
merging of the 2 noisemakers:
($M_k$, $V_k$) remains unchanged for $k \neq (k_1, k_2)$ $$\hat{M}_{k_1,k_2} = (V_{k_1}^{-1} + V_{k_2}^{-1})^{-1} (V_{k_1}^{-1} \hat{M}_{k_1} + V_{k_2}^{-1} \hat{M}_{k_2}) \qquad [22]$$

and $$V_{k_1 k_2} = (V_{k1}^{-1} + V_{k2}^{-1})^{-1} \qquad [23]$$

merging of the tracks making up the 2 merged noisemakers.

On exiting the loop, when $d_{k_1,k_2} >$ threshold, the partitioning of the $N_1 + N_2$ noisemakers into K noisemakers is obtained, together with the azimuthal and frequency tracks making up the new noisemakers.

On completion of the first step of the method according to the invention the initial tracks are thus grouped together so as to form merged tracks also dubbed "detected macro-events" ("macro-evd"). Each merged track associates the azimuthal track arising from this first step and the frequency tracks of the various initial tracks which have been merged to form this track.

The majority of these merged tracks correspond to real noisemakers generating various noises. These noises give rise to the initial tracks provided by the tracking (ADT). However, as stated previously, it is possible that the merging operation carried out during the first step may lead to the inter-merging, as a function of their proximity, of the initial tracks having no common origin. Incorrect merging of tracks is then obtained and the resulting track must be identified and considered with care.

In order to identify the erroneous noisemakers, it is necessary to be able to refine the characterization of the noisemakers constituted by the azimuthal merging of the initial tracks. For this purpose, the second step of the method according to the invention performs a spectral analysis operation on the various frequency tracks, associated with the azimuthal track resulting from the merging operation performed during the first step (merged track). The procedure used consists in performing for each noisemaker, on the basis of the frequency tracks constituting a merged track, and therefore the corresponding noisemaker, an estimation of the families of harmonics characterizing this noisemaker. This estimation is carried out by means of models consisting of determined spectral line combs. The principle of the procedure implemented is described subsequently in the document.

According to the invention, a sorting of the noisemakers making it possible to separate the not very noisy noisemakers, that is to say grouping together few frequency tracks, from the very noisy noisemakers composed of numerous tracks, is firstly performed.

Then, secondly, for each of the very noisy noisemakers, that is to say those exhibiting a large number of spectral components, the families of harmonics grouping together the spectral components constituting the noisemaker considered are estimated. It is recalled at this juncture that a family of harmonics is a set of spectral lines ($f_i$) such that:

$$f_i(t) = f_c(t) + k \cdot f_o(t) \qquad [24]$$

where $f_c$ is the central frequency, $f_o$ is the fundamental and k the rank of the harmonic.

Thereafter, one seeks to determine for each given set of merged tracks (i.e. for each noisemaker), the parameters $f_c$ and $f_o$ of the family of harmonics best corresponding to the noisemaker.

To carry out this operation, the function defined by the following relation is considered:

$$R(f_c, f_o) = \sum_{i=1}^{K} \sum_{j=1}^{N} \text{Log}_{10}(sb^{moy}(j)) \times d(f_i, fr^{moy}(j)) \qquad [25]$$

in which:
K represents the number of spectral lines, of frequency $f_i$, of the chosen harmonic comb model, the frequency $f_i(t)$ of each spectral line being in this case considered to be a frequency f, that is constant over time;
N represents the number of frequency tracks j making up the noisemaker;
$d(f_i, fr^{moy}(j))$ is a function defined by:

$$d(f_i, fr^{moy}(j)) = 1 \text{ if } |f_i - fr^{moy}(j)| \leq e$$

$$d(f_i, fr^{moy}(j)) = 0 \text{ otherwise;}$$

$$sb^{moy}(j) = \underset{t=1,\ldots,t_{max}(j)}{moy}(sb(j,t));$$

sb(j,t) being the signal-to-noise ratio of the measurement for the instant t, associated with frequency track j, $$fr^{moy}(j) = \underset{t=1,\ldots,t_{max}(j)}{moy}(fr(j,t)),$$

fr(j,t) representing the frequency of frequency track j at the instant t and $$\underset{t}{moy}(s)$$

the mean of s over the duration $t_{max}$.

The function $R(f_c, f_o)$ defines a certain shape of correlation between the merged track (the noisemaker) considered, and the comb of spectral lines taken as model. The elementary operation performed thus consists, for each frequency track j in measuring the mean, over the integration time $t_{max}$, of the signal-to-noise ratio of the frequency track j considered and in validating this value if the mean value, over the duration $t_{max}$, of the frequency of track j differs from one of the spectral lines of the model, by a frequency value of less than the frequency spacing separating the spectral lines constituting the model. The calculation is performed, for each spectral line of the model, for the set of frequency tracks j constituting the noisemaker considered, J varying from 1 to N. The results then form the subject of a double summation $$\left( \sum_{i=1}^{K} \sum_{j=1}^{N} \right)$$

as mentioned by relation [25].

The implementation of this procedure therefore consists in fixing the number K of spectral lines of the model, the width $\epsilon$ of the teeth of the comb (i.e. the gap between the spectral lines in the chosen model) and the span of variation of $f_0$, knowing that the span of variation of $f_c$ is, for its part, given by the processed range of frequencies. The procedure also consists in fixing the quantization spacings for $f_o$ and $f_c$.

The family of harmonics searched for is then obtained, in a known manner, by maximizing the correlation function defined by:

$$\hat{f}_c, \hat{f}_0 = \max_{(f_c, f_o)} R(f_c, f_o). \qquad [26]$$

It should however be noted that the correlation function always exhibits a maximum and that it is therefore necessary to be able to decide whether the maximum in question is significant, that is to say whether it actually corresponds to the agreement of the spectral components of the tracks with the corresponding harmonic comb. Specifically, the noisemaker's image, obtained by correlation with the various models (image of the energies), exhibits ambiguities in the central frequency $f_c$ and the fundamental $f_o$.

To resolve these ambiguities, the method according to the invention uses not just the maximum defined by relation [26] but also the three immediately lower maxima, and thus preserves four models ($f_c$, $f_0$) for analysis purposes. The processing performed then consists in determining from among the four pairs (fc, fo) each characterizing a model comb, that which corresponds to the extended comb (over the processed range of frequencies) having the largest number of teeth (of spectral lines) and for which the number of spectral lines which coincide with spectral lines of the noisemaker is the highest. The comb defined on the basis of the model comb considered and whose spectral lines extend over the whole of the range of frequencies defined (and not solely the K spectral lines of the model) from the central frequency $f_c$ of the model is here called the "extended comb".

Hence the model most suited to the noisemaker considered is thus determined on the basis of the following three criteria:
maximum value of $R(f_c, f_o)$: this must be greater than a given threshold, proportion of spectral lines of the noisemaker corresponding to no spectral line of the extended comb considered: this must be as low as possible.

proportions of spectral lines of the extended comb considered corresponding to the spectral lines of the noisemaker: this must be as high as possible.

The model best fulfilling the three criteria is chosen.

In the simple example, illustrated by FIG. 7, the determination of the model most representative of the noisemaker, from among the four models that gave the largest four values of $R(f_c, f_o)$ is thus carried out for a given noisemaker 71, represented by the five continuous spectral lines. FIGS. 7-1, 7-2, and 7-3 illustrate the agreement of three of these models 72, 73 and 74, depicted dotted, with the noisemaker considered.

It may thus be noted in this simple example that out of the three models, it is the model 74 which appears to be the most representative of the noisemaker 71. Specifically, the model 72, consisting of a comb comprising three spectral lines in the frequency range considered, does not completely cover the noisemaker, two of whose spectral lines coincide with no spectral line of the model.

The model 73 for its part comprises ten spectral lines in the frequency range considered and completely covers the noisemaker. However some of these ten spectral lines coincide with no spectral line of the noisemaker considered. The model 74 for its part comprises five spectral lines in the frequency range considered, that is to say as many as the noisemaker. Each of these spectral lines coincides furthermore with one of the spectral lines of the noisemaker. Thus, the model 74, although not perhaps giving the maximum value to $R(f_c, f_o)$, is nevertheless the most suitable.

According to the invention, a noisemaker is therefore characterized by a given model and by the degree of coincidence that it exhibits with this model. This characterization makes it possible to grade the noisemakers into categories.

Thus, the first two of these three criteria make it possible to determine whether the model comb chosen by the procedure described previously is really representative of the noisemaker considered. The last criterion makes it possible, for its part, to perform a marking of the various noisemakers analysed. In this way, the noisemakers exhibiting a harmonic comb covering a wide portion of the frequency range analysed, and the noisemakers whose spectral lines are grouped together in a small interval of frequencies will form the subject of two different markings. The first ones, an exemplary spectral representation of which is presented in the illustration 8-2, generally correspond to noises emitted in a regular manner over long durations such as the noises produced by diesel engines fitted to sizeable craft of the "cargo" type for example; while the second ones, whose spectrum can be dubbed a "compact comb", an exemplary spectral representation of which is presented in the illustration 8-1, correspond to particular noises that are less constant, such as shaft line squealing, or propeller singing.

However, for certain noisemakers the coincidence with the model selected remains less sharp, in particular in the case where the value attained by the second criterion is high. Such is in particular the case when the spectrum of the noisemaker considered exhibits several families of harmonics. The model selected then coincides only with one or the other of the families and does not exhibit any coincidence with the other family. Such a configuration, an exemplary spectral representation of which is presented in the illustration 8-3, generally arises from the merging of initial tracks which, although lying in very close azimuths, correspond to different noisemakers. Such is for example the case when two different objects forming two noisemakers move in a parallel manner, or when one and the same object incorporates two distinct noise sources. These noisemakers, less well defined by their model, form according to the invention the subject of a third marking different from the first two.

In this way on completion of the second step of the method according to the invention, a noisemaker set is advantageously now available, each noisemaker being characterized at one and the same time by its azimuth, that is to say the azimuth of the representative of the corresponding merged track obtained on completion of the first step of the method, and by the spectral model (i.e. the harmonic comb) associated with it during the second step, rather than a simple set of merged tracks characterized by their azimuths. Furthermore, coarse information is available, for each of the noisemakers, relating to its origin which results in the grading of each noisemaker into one of the three groups described previously. This coarse information can thereafter be used to perform complementary processings for classifying the noisemakers, which processings depart from the scope of the present patent application.

The invention claimed is:

1. A method for merging groups of initial tracks to produce merged tracks, and automatic analysis and sorting of the merged tracks, wherein the method comprises the steps of:
receiving signals by an electromagnetic sensor or an acoustic sensor, to produce one or more initial tracks, each initial track including data that characterizes an evolution over time of a bearing position and of a Doppler frequency of an assumed object;
grouping the initial tracks corresponding to substantially identical azimuths so as to form merged tracks; and
selecting, by use of frequency analysis, the merged tracks whose spectrum forms a harmonic comb characteristic of a single real object.

2. The method according to claim 1, wherein the initial tracks are constructed from an automatic target detection and tracking procedure.

3. The method according to claim 1, wherein the step of grouping the initial tracks further comprises the step of iteratively merging two tracks that are closest together in azimuth, wherein the iterative process is stopped when a value of a criterion related to an azimuthal distance of the two tracks that are closest together in azimuth exceeds a fixed threshold value.

4. The method according to claim 3, wherein the step of grouping the initial tracks is associated with a comparison at each iteration of a fixed threshold to a value of a quantity dependent on a generalized likelihood ratio, determined in accordance with the following relationship:

$$L(K-1)=L(K)+\|\hat{M}_{k1}-\hat{M}_{k2}\|^2 v_{k1}+v_{k2}$$

wherein:
K is a quantity of independent assumed objects;
L(K) is the generalized likelihood ratio;
$\hat{M}_{k1}$ and $\hat{M}_{k2}$ are mean vectors representing the two tracks;
$V_{k1}$ and $V_{k2}$ are variances of measurements associated with one of the two tracks, respectively; and
$\|\hat{M}_{k1}-\hat{M}_{k2}\|^2 v_{k1}+v_{k2}$ is a normalized deviation between estimated values of means of the two tracks merged during said iteration.

5. The method according to claim 4, wherein a function of the generalized likelihood ratio is used, the function determined in accordance with the following relationship:

$$f(K)=-2 \text{ Log}(L(K))$$

wherein f(K) is distributed asymptotically according to a centered chi-squared ($\chi^2$) law, with (N−k)×n degrees of freedom, the method further comprising the step of halting the iterative process when, for an iteration, a value of f(K) attains a predetermined chi-squared value.

6. The method according to claim 4, wherein a function of the generalized likelihood ratio is used, the function determined in accordance with the following relationship:

$$f(K) = -2 \log(L(K))$$

wherein the method further comprises the steps of:
determining a value of a point of intersection of a first and second tangent to a curve representing f(K); and
halting the iterative process when, for an iteration, f(K) is substantially equal to the value of the point of intersection.

7. The method according to claim 4, wherein a function of the generalized likelihood ratio is used, the function determined in accordance with the following relationship:

$$g(K) = K^2 (2 \log(L(K))$$

wherein the method further comprises the steps of:
searching for a minimum of g(K);
halting the iterative process when, for an iteration, g(K) is substantially equal to a value corresponding to the minimum of g(K).

8. The method according to claim 1, wherein the step of grouping the initial tracks further comprises the steps of:
estimating, by linear regression, bearing parameters, $(\beta_0)_{1,\ldots,n}$, and slew rate parameters, $(\dot{\beta})_{1,\ldots,n}$, of each of the tracks;
determining a histogram of the bearing parameters $(\beta_0)_{1,\ldots,n}$, in order to merge the tracks, the histogram being determined from a mixture of Gaussian laws that correspond to a local maxima of the histogram, wherein each Gaussian law delimiting an angular sector is associated with an assumed object.

9. The method according to claim 8, wherein the step of grouping the initial tracks further comprises the steps of:
estimating $(\beta_0, \dot{\beta})_{1,\ldots,n}$;
formulating the histogram of the bearing parameters $(\beta_0)_{1,\ldots,n}$;
determining a number K of independent assumed objects by use of the histogram;
initializing a method for estimating the mixture of Gaussian laws by use of local maxima of the histogram of the bearing parameters $(\beta_0)_{1,\ldots,n}$;
determining a permutation k which with each track of rank i associates an assumed object from which it arises;
estimating the parameters $(\hat{M}_i, \hat{V}_i)_{i=1,\ldots,K}$ that represent the merged tracks.

10. The method according to claim 3, wherein the step of selecting the merged tracks further comprises, for each assumed object that corresponds to the frequency tracks of a predetermined merged track, estimating families of harmonics that characterize the assumed object to produce an estimation, the estimation calculated by use of determined spectral line combs used as models.

11. The method according to claim 10, further comprising the steps of:
sorting assumed objects in order to separate less noisy assumed objects that have a number of tracks which is less than a first predetermined number of tracks, from noisy assumed object that have a number of tracks which is greater than a second predetermined number of tracks;
for each noisy assumed object, estimating the families of harmonics by grouping together the spectral components that constitute the noisy assumed object;
determining, for each noisy assumed object, a central frequency $f_c$ and a harmonic spacing $f_0$ for the family of harmonics that best corresponds to the assumed object.

* * * * *